US012450705B2

(12) United States Patent
Gafni et al.

(10) Patent No.: US 12,450,705 B2
(45) Date of Patent: Oct. 21, 2025

(54) ALTERING A FACIAL IDENTITY IN A VIDEO STREAM

(71) Applicant: Meta Platforms, Inc., Menlo Park, CA (US)

(72) Inventors: Oran Gafni, Ramat Gan (IL); Lior Wolf, Herzliya (IL)

(73) Assignee: Meta Platforms, Inc., Menlo Park, CA (US)

( * ) Notice: Subject to any disclaimer, the term of this patent is extended or adjusted under 35 U.S.C. 154(b) by 414 days.

(21) Appl. No.: 17/127,506

(22) Filed: Dec. 18, 2020

(65) Prior Publication Data

US 2022/0198617 A1  Jun. 23, 2022

(51) Int. Cl.
*G06T 5/75* (2024.01)
*G06N 20/00* (2019.01)
*G06T 5/70* (2024.01)
*G06V 40/16* (2022.01)

(52) U.S. Cl.
CPC ............... *G06T 5/75* (2024.01); *G06N 20/00* (2019.01); *G06T 5/70* (2024.01); *G06V 40/172* (2022.01)

(58) Field of Classification Search
CPC ......... G06T 5/004; G06T 5/002; G06N 20/00; G06V 40/172; G06V 40/165; G06V 40/174; G06V 10/82
See application file for complete search history.

(56) References Cited

U.S. PATENT DOCUMENTS

| 2003/0001838 | A1 | 1/2003 | Han et al. |
| 2013/0208005 | A1 | 8/2013 | Kasahara et al. |
| 2018/0365874 | A1 | 12/2018 | Hadap et al. |
| 2020/0234482 | A1 | 7/2020 | Krokhalev et al. |

FOREIGN PATENT DOCUMENTS

| CN | 110969572 A | 4/2020 |
| CN | 111971713 A | 11/2020 |
| CN | 112036219 A | 12/2020 |

OTHER PUBLICATIONS

"Oran Gafni et. al., Live Face De-Identification in Video, International Conference on Computer Vision ICCV, Nov. 2019, pp. 9378-9387" (Year: 2019).*

(Continued)

*Primary Examiner* — Michael Horabik
*Assistant Examiner* — Phuong Hau Cai
(74) *Attorney, Agent, or Firm* — Seyfarth Shaw LLP

(57) ABSTRACT

A computing device performs generating a first identity encoding representing a first facial identity of the person based on an image of a person, generating a second identity encoding representing a second facial identity different from the first facial identity of the person based on the first identity encoding, generating a source encoding by using an encoder to process a source image of the person having an expression, generating an intermediate image by using a decoder to process the source encoding and the second identity encoding, the intermediate image including a face having the second facial identity and the expression of the person in the source image, and generating an output image by blending the source image with facial features of the face in the intermediate image.

20 Claims, 7 Drawing Sheets

(56) References Cited

OTHER PUBLICATIONS

"Yuval Nirkin et. al., On Face Segmentation, Face Swapping, and Face Perception, 2018 13th IEEE International Conference on Automatic Face and Gesture Recognition" (Year: 2018).*
"Naser Damer et. al., Deep Learning-based Face Recognition and the Robustness to Perspective Distortion," Aug. 2018, 2018 International Conference on Pattern Recognition, Beijing, China (Year: 2018).*
"Aparna Bharati et. al., Detecting Facial Retouching Using Supervised Deep Learning, Nov. 2016, IEEE Transactions on Information Forensics and Security vol. 11, No. 9" (Year: 2016).*
"Aparna Bharati et. al., Detecting Facial Retouching Using Supervised Deep Learning, Sep. 2016, IEEE Transactions on Information Forensics and Security, vol. 11, Issue 9" (Year: 2016).*
"Apama Bharati et. al., Detecting Facial Retouching Using Supervised Deep Learning, Sep. 2016, IEEE Transactions on Information Forensics and Security, vol. 11, Issue 9" (Year: 2016).*
Benaim, et al., One-Sided Unsupervised Domain Mapping, arXiv:1706.00826v2 [cs.CV], In NIPS, 18 pages, Nov. 18, 2017.
Bitouk, et al., Face Swapping: Automatically Replacing Faces in Photographs, ACM Transactions on Graphics, vol. 27, No. 3, Article 39, 8 pages, Aug. 2008.
Blanz, et al., Exchanging Faces in Images, EUROGRAPHICS 2004 / M.-P. Cani and M. Slater, 23(3):1-8, 2004.
Cao, et al., VGGFace2: A Dataset for Recognising Faces Across Pose and Age, arXiv:1710.08097v2 [cs.CV], IFEE, 11 pages, May 13, 2018.
Chen, et al., InfoGAN: Interpretable Representation Learning by Information Maximizing Generative Adversarial Nets, arXiv:1606.03657v1, 14 pages, Jun. 12, 2016.
Chollet, Xception: Deep Learning with Depthwise Separable Convolutions, CVF, pp. 1251-1258.
Deng, et al., ArcFace: Additive Angular Margin Loss for Deep Face Recognition, CVPR, Computer Vision Foundation, pp. 4690-4699.
Deepfaks/Faceswap, GitHub—Deepfakes/Faceswap: Deepfakes Software for All, available via https://github.com/deepfakes/faceswap, 11 pages, Apr. 6, 2021.
Gafni, et al., Live Face De-Identification in Video, ICCV, CVF, pp. 9378-9387.
Goodfellow, et al., Generative Adversarial Nets Generative Adversarial Nets, arXiv:1406.2661v1, 9 pages, Jun. 10, 2014.
Gross, et al., Semi-Supervised Learning of Multi-Factor Models for Face De-Identification, 8 pages.
He, et al., Delving Deep into Rectifiers: Surpassing Human-Level Performance on ImageNet Classification, ICCV, CVF, pp. 1026-1034, Feb. 2015.
He, et al., Deep Residual Learning for Image Recognition, CVPR, CVF, pp. 770-778.
Huang, et al., Labeled Faces in the Wild: A Database for Studying Face Recognition in Unconstrained Environments, Workshop on Faces in 'Real-Life' Images: Detection, Alignment, and Recognition, Erik Learned-Miller and Andras Ferencz and Frédéric Jurie, Oct. 2008, Marseille, France, 15 pages, Oct. 2008.
Huang, et al., Multimodal Unsupervised Image-to-Image Translation, ECCV, 18 pages, 2018.
Johnson, et al., Perceptual losses for real-time style transfer and super-resolution, In ECCV, 18 pages, Mar. 27, 2016.
Jourabloo, et al., Attribute Preserved Face Deidentification, Department of Computer Science and Engineering, Michigan State University, 8 pages.
Karras, et al., Progressive Growing of Gans for Improved Quality, Stability, and Variation, arXiv:1710.10196v3, In ICLR, 26 pages, Feb. 26, 2018.
Kazemi, et al., One Millisecond Face Alignment with an Ensemble of Regression Trees, In Proceedings of the IEEE conference on computer vision and pattern recognition, 8 pages, 2014.
Kemelmacher-Shlizerman, Transfiguring Portraits, ACM Trans. Graph., 35(4), Jul. 2016.

Kim, et al., Learning to Discover Cross-Domain Relations with Generative Adversarial Networks, Proceedings of the 34th International Conference on Machine Learning, Sydney, Australia, PMLR 70, 9 pages, 2017.
King, et al., Dlib-ml: A Machine Learning Toolkit, Journal of Machine Learning Research, 10(2009):1755-1758, 2009.
Kingma, et al., Adam: A Method for Stochastic Optimization, In ICLR, 15 pages, 2015.
Korshunova, et al., Fast Face-Swap Using Convolutional Neural Networks, In the IEEE International Conference on Computer Vision, pp. 3677-3685.
Kumar, et al., Attribute and Simile Classifiers for Face Verification, In CVPR, pp. 365-372, 2009.
Lample, et al. Fader Networks: Manipulating Images by Sliding Attributes, In NIPS, 10 pages, 2017.
Lee, et al., Diverse Image-To-Image Translation Via Disentangled Representations, In the European Conference on Computer Vision (ECCV), 17 pages, 2018.
Liu, et al., Unsupervised Image-To-Image Translation Networks, In NIPS, 11 pages, 2017.
Liu, et al., Deep Learning Face Attributes in The Wild, In ICCV, pp. 3730-3738.
Makhzani, et al., Adversarial Autoencoders, arXiv preprint arXiv:1511.05644v2, 16 pages, May 25, 2016.
Mao, et al., Least Squares Generative Adversarial Networks, In ICCV, pp. 2794-2802.
Meden, et al., Face Deidentification with Generative Deep Neural Networks, IET Signal Processing, 11(9):1046-1054, 2017.
Newton, et al., Preserving Privacy by De-Identifying Face Images, IEEE transactions on Knowledge and Data Engineering, Carnegie Mellon University, 26 pages, Mar. 2003.
Nirkin, et al., On Face Seg-Mentation, Face Swapping, And Face Perception, Arxiv:1704.06729v1, 14 pages, Apr. 22, 2017.
Oh, et al., Adversarial Image Perturbation for Privacy Protection a Game Theory Perspective, in 2017 IEEE international conference on computer vision (ICCV), 17 pages, Jul. 26, 2017.
Phillips, et al., An Introduction to the Good, the Bad, & the Ugly Face Recognition Challenge Problem, In Automatic Face & Gesture Recognition, 10 pages, Mar. 2011.
Radford, et al., Unsupervised Representation Learning with Deep Convolutional Generative Adversarial Networks, ICLR 2016, 16 pages, 2016.
Ronneberger, et al., U-net: Convolutional Networks for Biomedical Image Segmentation, arXiv:1505.04597v1, 8 pages, May 18, 2015.
Rössler, et al., FaceForensics: A large-scale Video Dataset for Forgery Detection in Human Faces, arXiv:1803.09179v1, 21 pages, Mar. 24, 2017.
Salimans, et al., Improved Techniques for Training Gans, arXiv:1606.03498v1, 10 pages, Jun. 10, 2016.
Samarzija, et al., An Approach to the De-Identification of Faces in Different Poses, University of Zagreb, 13 pages, May 29, 2014.
Schroff, et al., Facenet: A Unified Embedding for Face Recognition and Clustering, CVPR, pp. 815-823, 2015.
Sun, et al., Natural and Effective Obfuscation by Head Inpainting, In Proceedings of the IEEE Conference on Computer Vision and Pattern Recognition, pp. 5050-5059.
Sun, et al., A hybrid Model for Identity Obfuscation by Face Replacement, In Proceedings of the European Conference on Computer Vision (ECCV), 17 pages, 2018.
Taigman, et al., Unsupervised Cross-Domain Image Generation, In International Conference on Learning Representations (ICLR), 14 pages, 2017.
Thies, et al., Face2face: Real-time Face Capture and Reenactment of RGB Videos, In Proceedings of the IEEE Conference on Computer Vision and Pattern Recognition, pp. 2387-2395.
Ulyanov, et al., Texture networks: Feed-forward Synthesis of Textures and Stylized Images, In ICML, 9 pages, 2016.
Ulyanov, et al., Instance Normalization: The Missing Ingredient for Fast Stylization, arXiv preprint arXiv:1607.08022v3, 6 pages, Nov. 6, 2017.
Wu, et al., Privacy-Protective-Gan For Face De-Identification, arXiv preprint arXiv:1806.08906v1, 11 pages, Nov. 23, 2018.
Xie, et al., Feature Denoising for Improving Adversarial Robustness, CVPR paper, 9 pages.

(56) References Cited

OTHER PUBLICATIONS

Yi, et al., DualGAN: Unsupervised Dual Learning for Image-To-Image Translation, ICCV pager, 9 pages.
Zhang, et al., Mixup: Beyond Empirical Risk Minimization, ICLR, arXiv:1710.09412v2, 13 pages, Apr. 27, 2018.
Huang P., et al., "Learning Identity-Invariant Motion Representations for Cross-ID Face Reenactment," IEEE/CVF Conference on Computer Vision and Pattern Recognition (CVPR), Jun. 13, 2020, pp. 7084-7092.
International Search Report and Written Opinion for International Application No. PCT/US2021/063372 mailed Apr. 4, 2022, 9 pages.
Office Action mailed Jul. 1, 2025 for Chinese Application No. 202180094210.X, filed Dec. 14, 2021, 8 pages.

* cited by examiner

ALTERING A FACIAL IDENTITY IN A VIDEO STREAM

TECHNICAL FIELD

This disclosure generally relates to image processing solutions, and in particular, related to generating an output image comprising a face with an altered facial identity of a face captured in a source image.

BACKGROUND

Artificial neural networks (ANNs), usually simply called neural networks (NNs), are computing systems vaguely inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times. Generative Adversarial Networks (GANs) are a type of the ANNs that generate new data, such as a new image, based on input data.

SUMMARY OF PARTICULAR EMBODIMENTS

Particular embodiments described herein relate to systems and methods for altering a facial identity of a person captured in an image or in a video frame such that a face recognition solution or a human fails to recognize an identity associated with the person. With advances of face recognition solutions, state-of-the-art face recognition solutions may be capable of recognizing an identity of a face in an image or in a video stream, even a video stream with a high frame rate. Although the face recognition solutions may have many useful applications, the face recognition solutions may raise numerous ethical concerns. Particularly, the face recognition solutions may lead to loss of privacy. The embodiments disclosed herein may focus on a video de-identification solution that may take a source video stream comprising a first face as an input and may generate an output video stream comprising a second face that looks similar to the first face but the perceived identity of the second face is different from that of the first face. The video de-identification solution may allow a user to post a natural-looking video message in a public forum in an anonymous way that would presumably prevent face recognition solutions from recognizing an identity of the user in the posted video message. The video de-identification solution may be able to modify a video stream in a seamless way without causing flickering or other visual artifacts and distortions. The video de-identification solution may change the identity of a face while the solution may keep all other aspects, such as pose, expression, lip positioning (for unaltered speech), occlusion, illumination, shadow, and their dynamics, of the face. The video de-identification solution may change the identity of multiple people within a single video frame or image for privacy preservation. The technology disclosed herein may be applied to a still image de-identification solution as well.

In particular embodiments, a computing device may access an identity encoding representing a facial identity. In particular embodiments, the computing device may generate a first identity encoding representing a first facial identity of a person based on an image of the person. In particular embodiments, the first identity encoding may be generated by processing the image with a pre-trained face recognition machine-learning model. The computing device may generate a second identity encoding representing a second facial identity different from the first facial identity of the person based on the first identity encoding. In particular embodiments, the second identity encoding may be generated using a facial-identity altering machine-learning model. The computing device may access the second identity encoding as the identity encoding. In particular embodiments, the facial-identity altering machine-learning model may comprise an encoder and a decoder. In particular embodiments, the facial-identity altering machine-learning model may comprise one or more fully connected layers. The computing device may generate a source encoding by using an encoder of a first machine-learning model to process a source image of the person having an expression. In particular embodiments, the source image may correspond to a frame of a video stream. The computing device may generate an intermediate image and a blending mask by using a decoder of the first machine-learning model to process the source encoding and the identity encoding. The intermediate image may comprise a face having the facial identity represented by the identity encoding and the expression of the person in the source image. The blending mask may represent a blending weight to be applied to the intermediate image at each pixel of an output image. The computing device may generate the output image by blending the source image with facial features of the face in the intermediate image. In order to blend the source image with facial features of the face in the intermediate image, the computing device may create the output image by applying an inverse of the blending mask to the source image. Then, the computing device may project the mask-applied intermediate image to the output image.

In particular embodiments, a pair of images may be used as training data at an iteration of a training procedure for the first machine-learning model. The pair of images may comprise a first image of a first person having an expression and a second image of a second person that may be different from the first person. In particular embodiments, the first person and the second person may be the same person. During an iteration of the training procedure, the computing device may generate a training source encoding by using the encoder of the first machine-learning model to process a distorted first image of the pair. The distorted first image may prevent the first machine-learning model from generating a training intermediate image identical to the first image. The computing device may generate a training identity encoding by using a pre-trained face recognition machine-learning model to process the second image of the pair. The computing device may generate a training intermediate image by using the decoder of the first machine-learning model to process the training source encoding and the training identity encoding. The computing device may generate a training output image by blending the first image with facial features of a face in the training intermediate image. The computing device may compute losses based on the training intermediate image or the training output image. The losses may comprise perceptual losses. The computing device may compute the perceptual losses at k different layers. The perceptual losses at i lowest layers out of the k layers may be computed based on comparisons between the first image and the training output image. The perceptual losses at the remaining k−i layers may be computed based on comparisons between the second image and the training output image. The computing device may update trainable variables of the first machine-learning model based on the computed losses. The computing device may update the trainable variables of the first machine-learning model to minimize the perceptual losses.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
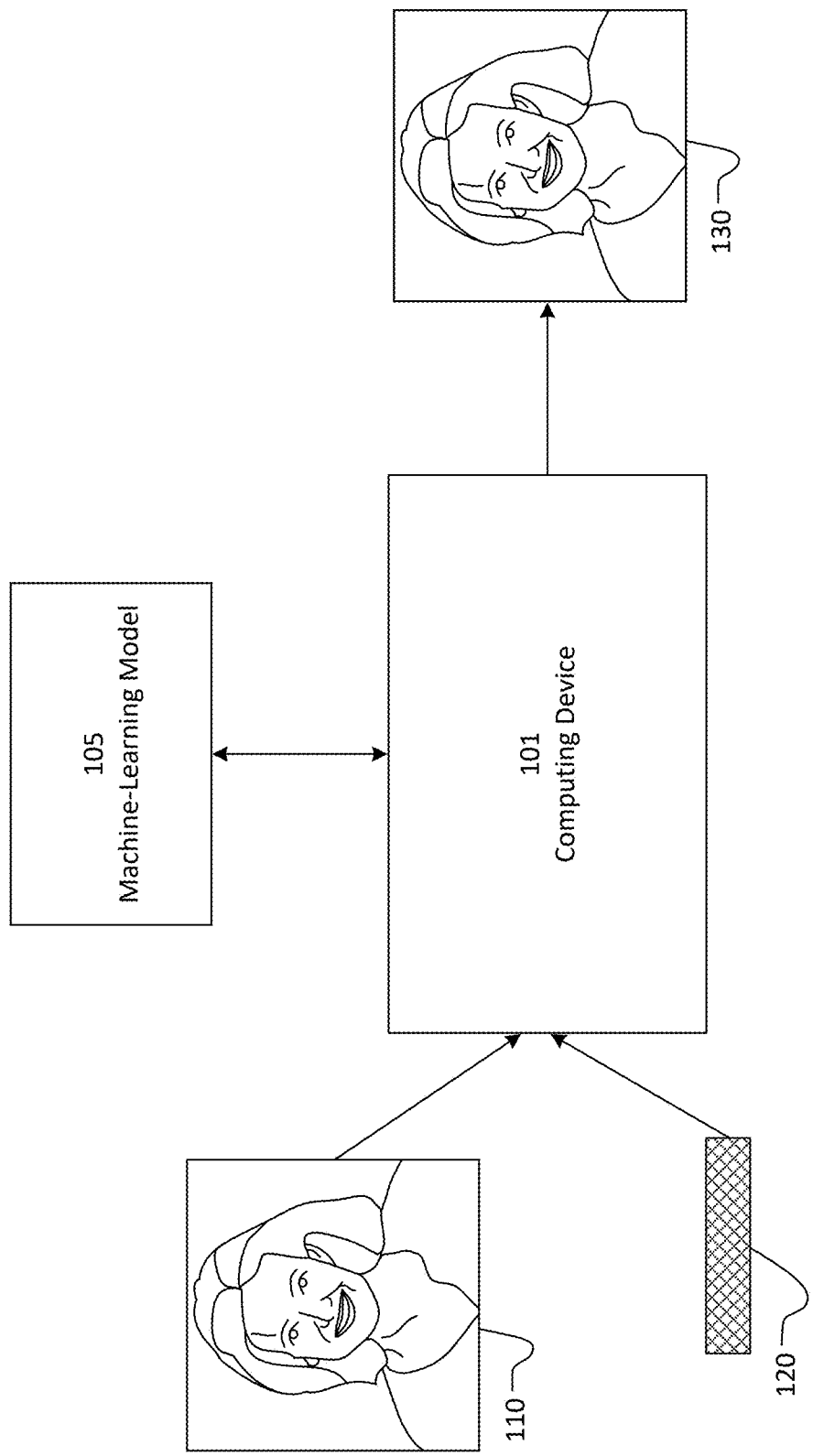
FIG. 1 illustrates an example architecture for altering a facial identity of a face in an image.

FIG. 1 illustrates an example architecture for altering a facial identity of a face in an image. A state-of-the-art face recognition solution may recognize an identity of a face in an image or in a video stream, even a video stream with a high frame rate. Although the face recognition solutions may have many useful applications, the face recognition solutions may raise numerous ethical concerns. Particularly, the face recognition solutions may lead to loss of privacy. With the technologies disclosed herein, a computing device 101 may generate an output image 130 by altering a facial identity of a person captured in a source image 110 using a machine-learning model 105. An identity encoding 120 representing an altered facial identity of the person may also be provided to the machine-learning model 105. The person in the output image 130 may have the facial identity represented by the identity encoding 120. But, the person in the output image 130 may keep all other aspects of the face, including, but not limited to, pose, expression, lip positioning, occlusion, illumination, shadow, and their dynamics. The source image 110 may be an image corresponding to a frame of a video stream. The machine-learning model 105 may be a generative adversarial network (GAN). The computing device 101 may be able to modify a video stream in a seamless way without causing flickering or other visual artifacts and distortions. Although this disclosure describes a particular architecture for altering a facial identity of a face in an image, this disclosure contemplates any suitable architecture for altering a facial identity of a face in an image.

In particular embodiments, the computing device 101 may access an identity encoding 120 representing a facial identity. In particular embodiments, the computing device 101 may generate a first identity encoding representing a first facial identity of a person based on an image of the person. In particular embodiments, the first identity encoding may be generated by processing the image with a pre-trained face recognition machine-learning model. The computing device 101 may generate a second identity encoding representing a second facial identity different from the first facial identity of the person based on the first identity encoding. In particular embodiments, the second identity encoding may be generated using a facial-identity altering machine-learning model. The computing device 101 may access the second identity encoding as the identity encoding 120. In particular embodiments, the facial-identity altering machine-learning model may comprise an encoder and a decoder. In particular embodiments, the facial-identity altering machine-learning model may comprise one or more fully connected layers. The computing device 101 may generate a source encoding by using an encoder of a first machine-learning model 105 to process a source image 110 of the person having an expression. In particular embodiments, the source image 110 may correspond to a frame of a video stream. The computing device 101 may generate an intermediate image and a blending mask by using a decoder of the first machine-learning model 105 to process the source encoding and the identity encoding 120. The intermediate image may comprise a face having the facial identity represented by the identity encoding 120 and the expression of the person in the source image 110. The blending mask may represent a blending weight to be applied to the intermediate image at each pixel of an output image 130. The computing device 101 may generate the output image 130 by blending the source image 110 with facial features of the face in the intermediate image. In order to blend the source image with facial features of the face in the intermediate image, the computing device 101 may create the output image 130 by applying an inverse of the blending mask to the source image 110. Then, the computing device 101 may project the mask-applied intermediate image to the output image 130. Although this disclosure describes altering a facial identity of a face in an image using a machine-learning model in a particular manner, this disclosure contemplates altering a facial identity of a face in an image using a machine-learning model in any suitable manner.

In particular embodiments, the computing device 101 may access an identity encoding 120 representing a facial identity to alter a facial identity of a person in the source image 110. In particular embodiments, the identity encoding may be generated by processing an image of a second person who is different from the person in the source image 110 with a pre-trained face recognition machine-learning model. When the identity encoding 120 based on the second person is used as an input for altering a face identity of a first person in the source image 110, a facial identity of a face in the output image 130 may be the facial identity of the second person. The face in the output image 130 may keep the other aspects, including pose, expression, lip positioning, occlusion, illumination, shadow, and their dynamics, of the face in the source image 110. Although this disclosure describes generating an identity encoding by processing an image of a second person who is different from a first person in the source image with a pre-trained face recognition machine-learning model in a particular manner, this disclosure contemplates generating an identity encoding by processing an image of a second person who is different from a first person in the source image with a pre-trained face recognition machine-learning model in any suitable manner.

Figure 2A:
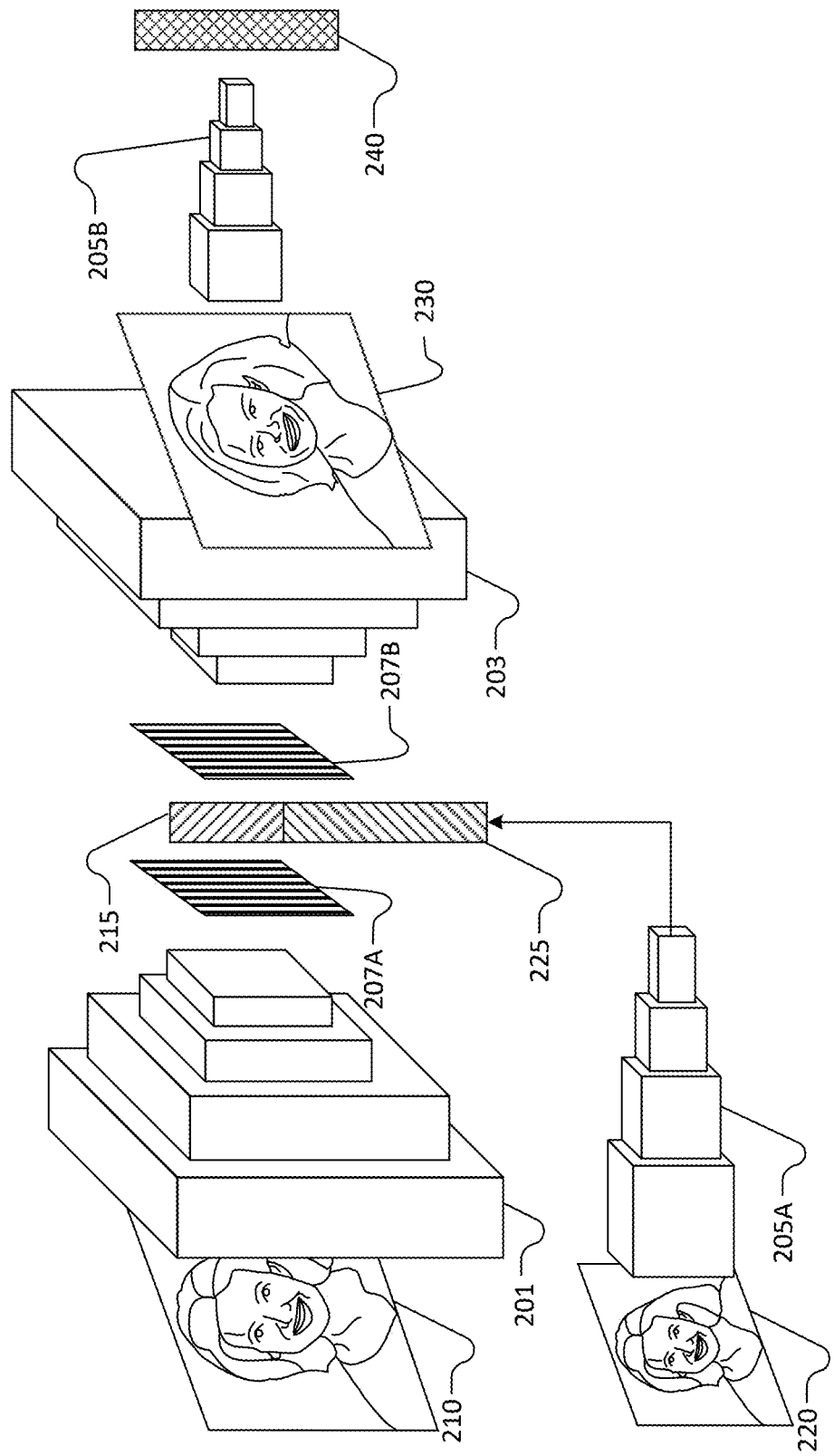
FIG. 2A illustrates an example process for generating an identity encoding using a machine-learning model with an encoder-decoder architecture.

In particular embodiments, a second computing device may generate a first identity encoding representing a first facial identity of a person based on an image of the person. In particular embodiments, the person may be an identical person to one in the source image 110. In particular embodiments, the first identity encoding may be generated by processing the image with a pre-trained face recognition machine-learning model. The second computing device may generate a second identity encoding representing a second facial identity that is different from the first facial identity of the person based on the first identity encoding. In particular embodiments, the second identity encoding may be generated using a facial-identity altering machine-learning model. In particular embodiments, the facial-identity altering machine-learning model may comprise an encoder and a decoder. The computing device 101 may access the second identity encoding as the identity encoding 120. In particular embodiments, the second computing device may be the computing device 101. FIG. 2A illustrates an example process for generating an identity encoding using a machine-learning model with an encoder-decoder architecture. As an example and not by way of limitation, illustrated in FIG. 2A, the second computing device may generate an encoding 215 by processing a first image 210 with an encoder 201 of a machine-learning model followed by zero or more fully connected layers 207A of the machine-learning model. The second computing device may generate the first identity encoding 225 representing the first facial identity of the person in an image 220 by processing a second image 220 with a pre-trained face recognition machine-learning model 205A. In particular embodiments, the person in the second image 220 may be identical to the person in the source image 110. The person in the first image 210 may be identical to the person in the second image 220. In particular embodiments, the first image 210 and the second image 220 may be different. In particular embodiments, the first image 210 and the second image 220 may be identical. The second computing device may combine the first identity encoding 225 with the encoding 215. The computing device may generate a third image 230 of a face with a second facial identity by processing the combined encodings with zero or more fully connected layers 207B followed by a decoder 203 of the machine-learning model. The second facial identity may be different from the first facial identity. In particular embodiments, the machine-learning model may comprise the encoder 201, the decoder 203, zero or more fully connected layers 207A following to the encoder 201, and zero or more fully connected layers 207B followed by the decoder 203. Finally, the second computing device may generate the second identity encoding 240 representing the second facial identity by processing the image 230 with a pre-trained face recognition machine-learning model 205B. The computing device 101 may access the second identity encoding 240 as the identity encoding 120. Details of the machine-learning model with the encoder-decoder architecture and a process for generating the second identity encoding 240 may be found in Oran Gafni, Lior Wolf, Yaniv Taigman, "Live Face De-Identification in Video," Proceedings of International Conference on Computer Vision (ICCV), 27 Oct. 2019. Although this disclosure describes generating an identity encoding representing a facial identity different from a facial identity of a face in the source image by using a machine-learning model with an encoder-decoder architecture in a particular manner, this disclosure contemplates generating an identity encoding representing a facial identity different from a facial identity of a face in the source image by using a machine-learning model with an encoder-decoder architecture in any suitable manner.

Figure 2B:
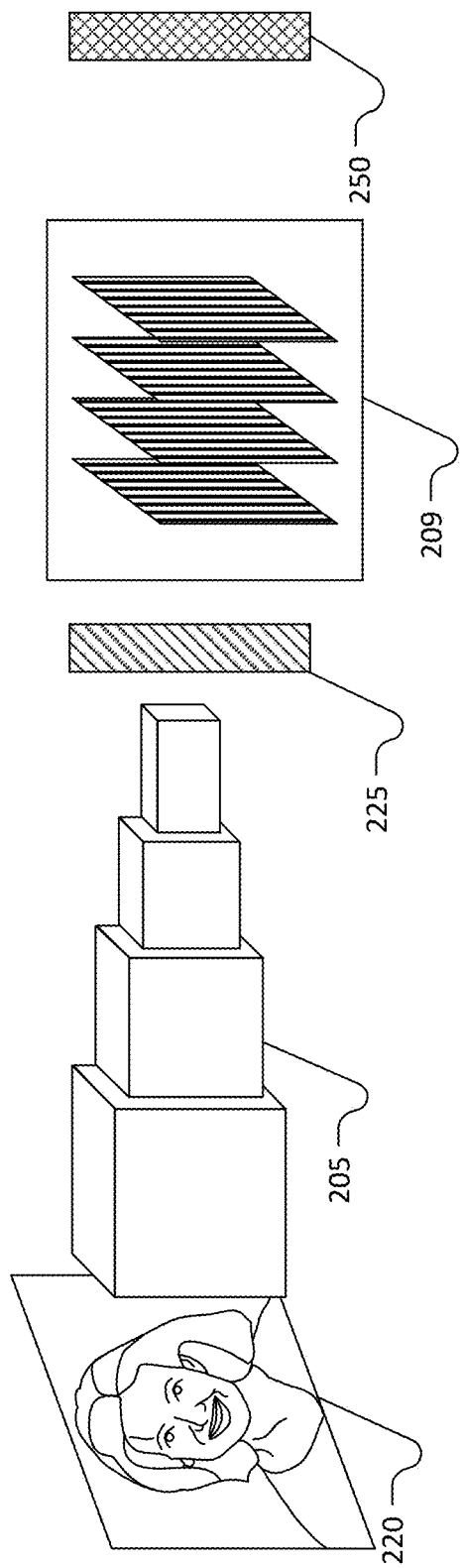
FIG. 2B illustrates an example process for generating an identity encoding using a machine-learning model comprising fully connected layers.

In particular embodiments, the second computing device may generate a first identity encoding representing a first facial identity of a person based on an image of the person. In particular embodiments, the person may be an identical person to one in the source image 110. In particular embodiments, the first identity encoding may be generated by processing the image with a pre-trained face recognition machine-learning model. The computing device 101 may generate a second identity encoding representing a second facial identity that is different from the first facial identity of the person based on the first identity encoding. In particular embodiments, the second identity encoding may be generated using a facial-identity altering machine-learning model. In particular embodiments, the facial-identity altering machine-learning model may comprise one or more fully connected layers. The computing device 101 may access the second identity encoding as the identity encoding 120. FIG. 2B illustrates an example process for generating an identity encoding using a machine-learning model comprising fully connected layers. As an example and not by way of limitation, illustrated in FIG. 2B, the second computing device may generate a first identity encoding 225 by processing an image 220 with a pre-trained face recognition machine-learning model 205. In particular embodiments, a person in the image 220 may be identical to the person in the source image 110. The second computing device may generate a second identity encoding 250 by processing the first identity encoding 225 with a machine-learning model 209 comprising one or more fully connected layers. The second identity encoding 250 may represent a facial identity different from a facial identity represented by the first identity encoding 225. The computing device 101 may access the second identity encoding 250 as the identity encoding 120. In particular embodiments, the second computing device may be the computing device 101. Although this disclosure describes generating an identity encoding representing a facial identity different from a facial identity of a face in the source image by using a machine-learning model comprising fully connected layers in a particular manner, this disclosure contemplates generating an identity encoding representing a facial identity different from a facial identity of a face in the source image by using a machine-learning model comprising fully connected layers in any suitable manner.

In particular embodiments, the facial-identity altering machine-learning model comprising fully connected layers illustrated in FIG. 2B may be trained with pairs of original face images and corresponding altered face images as training data. An altered face image corresponding to an original face image may be generated by processing the original face image with the facial-identity altering machine-learning model with an encoder-decoder architecture illustrated in FIG. 2A. As an example and not by way of limitation, for each original image 220 in a training data set, the second computing device may generate a face altered image 230 using the machine-learning model with an encoder-decoder architecture, which is illustrated in FIG. 2A. A pair of an original image 220 and a face altered image 230 may be used at an iteration of a training process for the facial-identity altering machine-learning model 209 comprising fully connected layers. Although this disclosure describes preparing training data for training the facial-identity altering machine-learning model comprising fully connected layers in a particular manner, this disclosure contemplates preparing training data for training the facial-identity altering machine-learning model comprising fully connected layers in any suitable manner.

Figure 3:
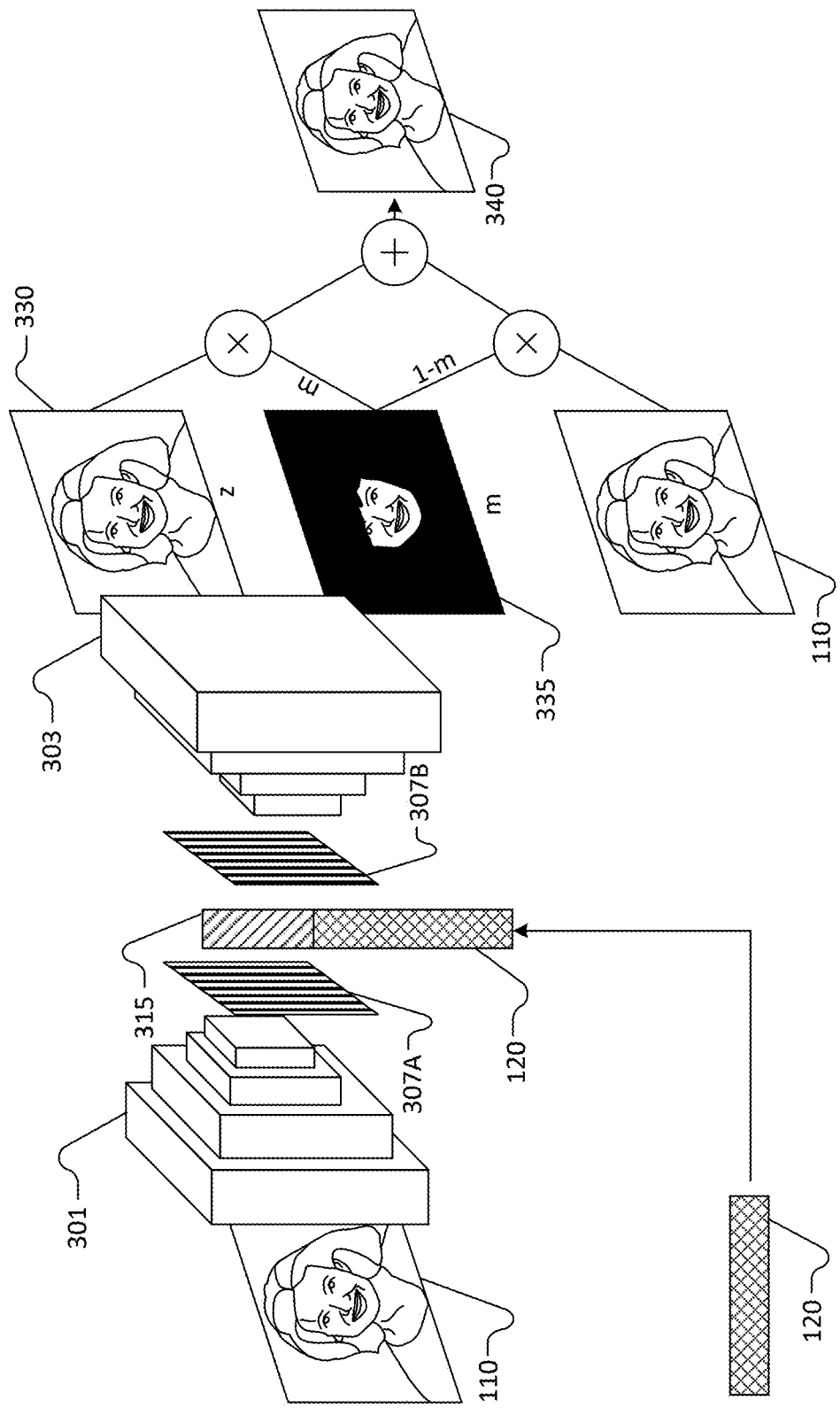
FIG. 3 illustrates an example architecture of a machine-learning model for altering a facial identity of a face in an image.

In particular embodiments, the computing device 101 may generate a source encoding by using an encoder of a first machine-learning model to process a source image of the person having an expression. In particular embodiments, the source image may correspond to a frame of a video stream. In such a case, the computing device 101 may generate an output image with altered identity for each frame of the video stream. FIG. 3 illustrates an example architecture of a machine-learning model for altering a facial identity of a face in an image. As an example and not by way of limitation, illustrated in FIG. 3, the computing device 101 may generate a source encoding 315 by processing a source image 110 with an encoder 301 of the first machine-learning model. The source encoding 315 may also be processed by zero or more fully connected layers 307A. In particular embodiments, the encoder 301 may comprise a convolutional layer followed by a plurality of depth-wise separable convolutions with instance normalization. In particular embodiments, the zero or more fully connected layers 307A may be considered as a part of the encoder 301. Although this disclosure describes generating a source encoding with an encoder of a machine-learning model in a particular manner, this disclosure contemplates generating a source encoding with an encoder of a machine-learning model in any suitable manner.

In particular embodiments, the computing device 101 may combine the source encoding 315 and the accessed identity encoding 120. In particular embodiments, the computing device 101 may generate an intermediate image and a blending mask by using a decoder of the first machine-learning model to process the source encoding and the accessed identity encoding 120. The intermediate image may comprise a face having a facial identity represented by the identity encoding 120 and the facial pose, facial expression, lip positioning, occlusion, illumination, shadow, and their dynamics of the person in the source image 110. As an example and not by way of limitation, continuing with a prior example illustrated in FIG. 3, the computing device 101 may generate an intermediate image 330 and a mask 335 by processing a combination of the combined source encoding 315 and the identity encoding 120 with zero or more fully connected layers 307B followed by a decoder 303 of the first machine-learning model. The intermediate image 330 may comprise a face having a facial identity represented by the identity encoding 120 and context information corresponding to a face in the source image 110. The context information corresponding to the face in the source image 110 may comprise facial pose, facial expression, lip positioning, occlusion, illumination, shadow, and their dynamics. The decoder 303 may comprise a series of combined upscale and residual blocks followed by a convolution for the intermediate image 330 and a convolution for the mask 335. In particular embodiments, the zero or more fully connected layer 307B may be considered as a part of the decoder 303. Although this disclosure describes generating an intermediate image comprising a face having a facial identity represented by the identity encoding and context information of a face in the source image by using a decoder of a machine-learning model in a particular manner, this disclosure contemplates generating an intermediate image comprising a face having a facial identity represented by the identity encoding and context information of a face in the source image by using a decoder of a machine-learning model in any suitable manner.

In particular embodiments, the computing device 101 may generate an output image by blending the source image with facial features of the face in the intermediate image. The blending mask may represent a blending weight to be applied to the intermediate image at each pixel of the output image. In order to blend the source image with facial features of the face in the intermediate image, the computing device 101 may create an output image by applying an inverse of the blending mask to the source image. Then, the computing device 101 may project the mask-applied intermediate image to the output image. As an example and not by way of limitation, continuing with a prior example illustrated in FIG. 3, the computing device 101 may create a temporary output image 340 by applying an inversed mask to the source image 110. The computing device may complete the output image 340 by combining a mask 335 applied intermediate image 330 to the temporary output image 340. The combining may incorporate the facial features of the face in the intermediate image 330 to the source image 110. The face in the output image 340 may have the facial identity represented by the identity encoding 120 and context information corresponding to a face in the source image 110. The context information corresponding to the face in the source image 110 may comprise facial pose, facial expression, lip positioning, occlusion, illumination, shadow, and their dynamics. Although this disclosure describes blending the source image with facial features of a face in the intermediate image in a particular manner, this disclosure contemplates blending the source image with facial features of a face in the intermediate image in any suitable manner.

In particular embodiments, a pair of images may be used as training data at an iteration of a training procedure for the first machine-learning model. The pair of images may comprise a first image of a first person having an expression and a second image of a second person that may be different from the first person. In particular embodiments, the first person and the second person may be the same person. During an iteration of the training procedure, the computing device 101 may generate a training source encoding by using the encoder 301 of the first machine-learning model to process a distorted first image of the pair. The distorted first image may prevent the first machine-learning model from generating a training intermediate image identical to the first image. The computing device 101 may generate a training identity encoding by using a pre-trained face recognition machine-learning model 205 to process the second image of the pair. The computing device 101 may generate a training intermediate image by using the decoder 303 of the first machine-learning model to process the training source encoding and the training identity encoding. The computing device 101 may generate a training output image by blending the first image with facial features of a face in the training intermediate image. The computing device 101 may compute losses based on the training intermediate image or the training output image. The losses may comprise perceptual losses. The computing device 101 may compute the perceptual losses at k different layers. The perceptual losses at i lowest layers out of the k layers may be computed based on comparisons between the first image and either the training intermediate image or the training output image. The perceptual losses at the remaining k−i layers may be computed based on comparisons between the second image and either the training intermediate image or the training output image. The computing device 101 may update trainable variables of the first machine-learning model based on the computed losses. In particular embodiments, the computing device 101 may update the trainable variables of the first machine-learning model to minimize the perceptual losses. Although this disclosure describes training of a GAN machine-learning model that alters a facial identity of a face in an image in a particular manner, this disclosure contemplates training of a GAN machine-learning model that alters a facial identity of a face in an image in any suitable manner.

In particular embodiments, a pair of images may be used as training data for an iteration of a training procedure for the first machine-learning model. The pair of images may comprise a first image of a first person having an expression and a second image of a second person who may be different from the first person. In particular embodiments, the first person and the second person may be the same person. In particular embodiments, the second image may be randomly selected for each first image. As an example and not by way of limitation, a set of images of faces may be collected for training the first machine-learning model that generates an image with an altered facial identity of a face in a source image. The images in the set of images may have faces of different persons from each other. For each image in the set of images, a randomly selected image among the other images in the set may be paired. Although this disclosure describes preparing training data for a machine-learning model for altering a facial identity of a face in an image in a particular manner, this disclosure contemplates preparing training data for a machine-learning model for altering a facial identity of a face in an image in any suitable manner.

In particular embodiments, a second computing device may generate a training source encoding by using the encoder 301 of the first machine-learning model to process a distorted first image of the pair during an iteration of the training procedure. The distorted first image may prevent the first machine-learning model from generating a training intermediate image identical to the first image. The second computing device may generate a training identity encoding by using a pre-trained face recognition machine-learning model 205 to process the second image of the pair. In particular embodiments, the second image may be randomly selected among the other images in the set of images. In particular embodiments, the second computing device may generate a training intermediate image by using the decoder 303 of the first machine-learning model to process the training source encoding and the training identity encoding. The second computing device may generate a training output image by blending the first image with facial features of a face in the training intermediate image. As an example and not by way of limitation, continuing with a prior example, a pair of a first image comprising a first face and a second image comprising a second face may be prepared for an iteration of a training process. The first face may be different from the second face. A second computing device may distort the first image by applying random scaling, rotation or elastic deformation to the first image. The distortion may prevent the first machine-learning model from reconstructing the identical image in early training stages. The second computing device may generate a training source encoding by processing the distorted first image with the encoder 301 followed by zero or more fully connected layers 307A of the first machine-learning model. The second computing device may generate a training identity encoding by processing the second image with a pre-trained face recognition machine-learning model 205. The second computing device may combine the training source encoding with the training identity encoding. The second computing device may generate a training intermediate image and a training mask by processing the combination of the training source encoding and the training identity encoding with the zero or more fully connected layers 307B followed by the decoder 303 of the first machine-learning model. The second computing device may create a temporary training output image by applying an inversed training mask to the first image. The second computing device may complete the training output image by combining a training mask applied training intermediate image to the temporary training output image. Although this disclosure describes generating an output image during an iteration of a training process for a machine-learning model in a particular manner, this disclosure contemplates generating an output image during an iteration of a training process for a machine-learning model in any suitable manner.

Figure 4:
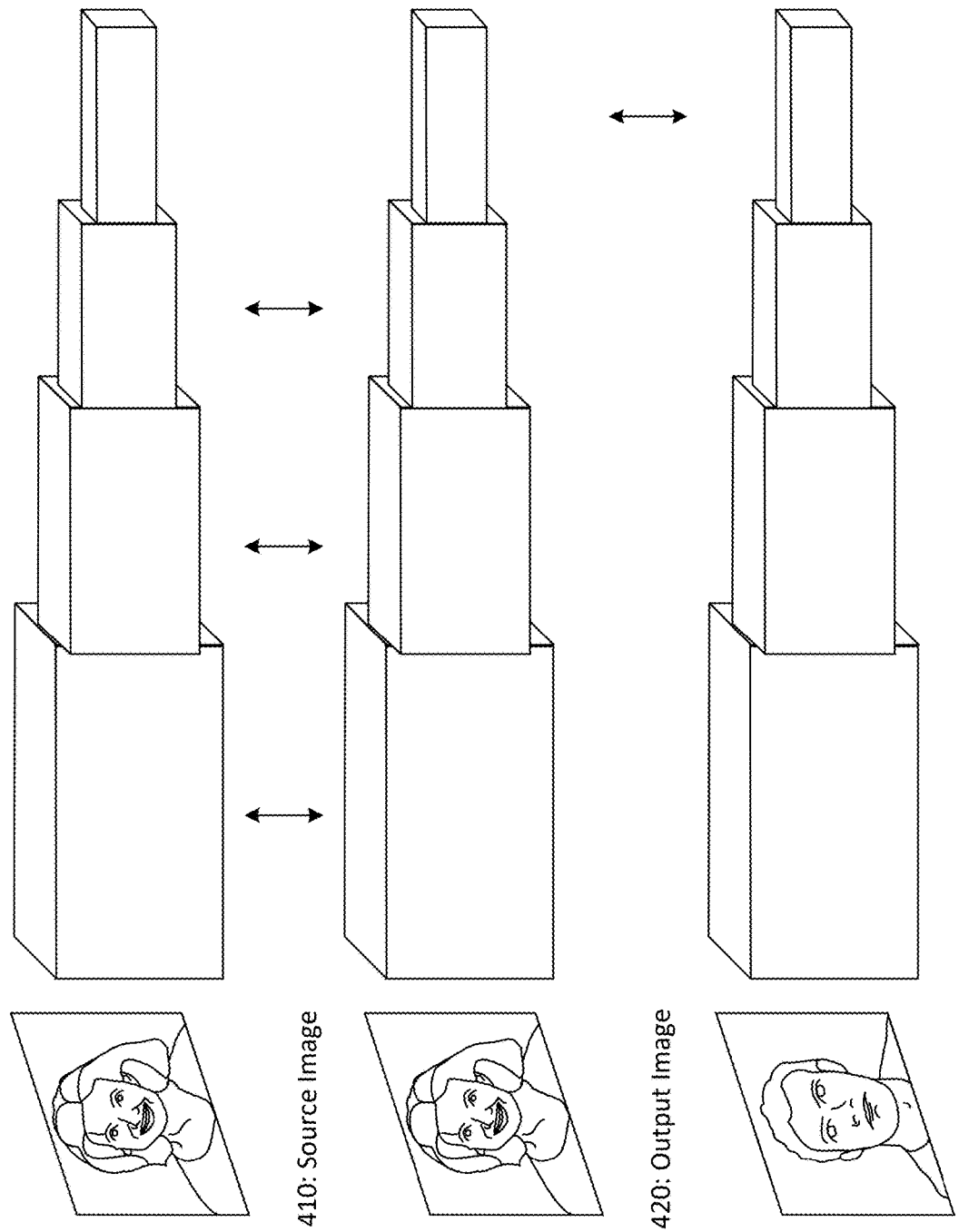
FIG. 4 illustrates an example computation for the perceptual losses.

In particular embodiments, the second computing device may compute losses based on the training intermediate image and the training output image. The losses may comprise perceptual losses. The computing device 101 may compute the perceptual losses at k different layers. The perceptual losses at i lowest layers out of the k layers may be computed based on comparisons between the undistorted first image and either the training intermediate image or the training output image. Those k layers may be referred to as low-to-medium abstract layers. The perceptual losses at the remaining k−i layers may be computed based on comparisons between the second image and either the training intermediate image or the training output image. The remaining k−i layers may be referred to as high abstract layers. The computing device 101 may update trainable variables of the first machine-learning model based on the computed losses. The computing device 101 may update the trainable variables of the first machine-learning model to minimize the perceptual losses. FIG. 4 illustrates an example computation for the perceptual losses. As an example and not by way of limitation, illustrated in FIG. 4, the second computing device may compute the perceptual losses at the first (lowest) three layers based on comparisons between the training source image 410, a.k.a., the first image, and the training output image 420. The second computing device may compute the perceptual losses at the last (highest) layer based on a comparison between the second image 430 and the training output image 420. The second computing device may compute gradients to minimize the perceptual losses and the other losses. The second computing device may update trainable variables in the first machine-learning model based on the computed gradients in a backward propagation stage. Although this disclosure describes updating trainable variables of a machine-learning model based on computed losses in a particular manner, this disclosure contemplates updating trainable variables of a machine-learning model based on computed losses in any suitable manner.

Figure 5:
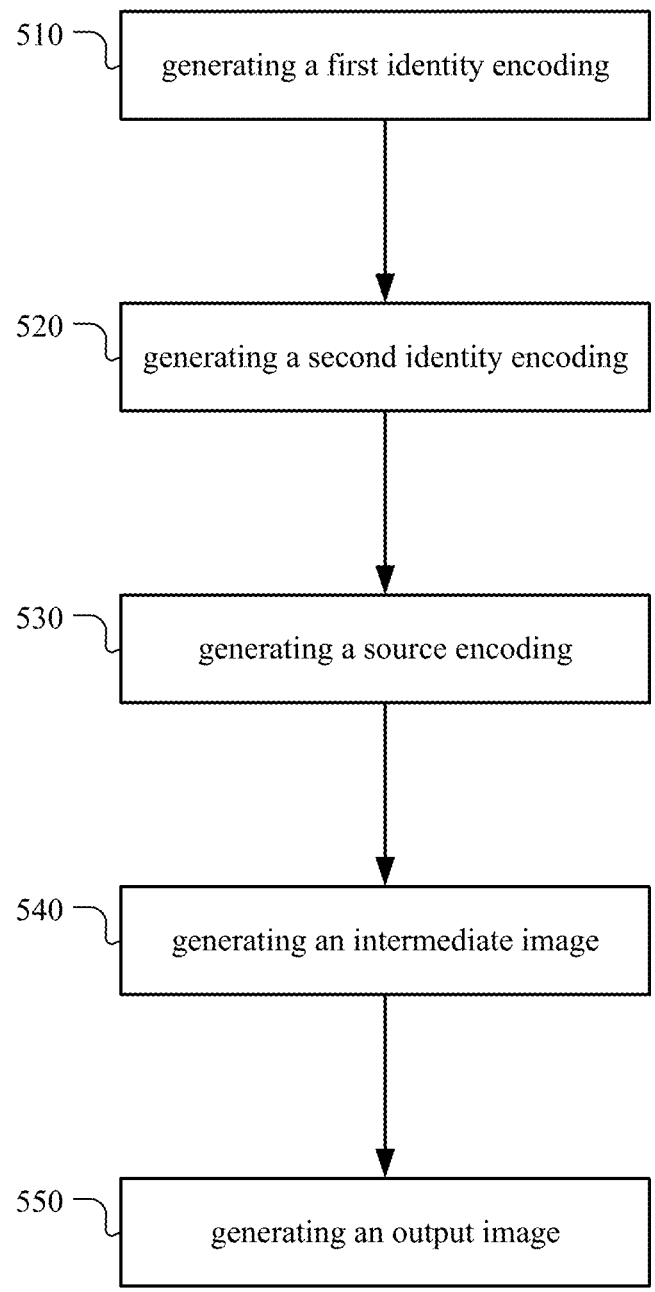
FIG. 5 illustrates an example method for altering a face identity of a face in an image.

FIG. 5 illustrates an example method 500 for altering a face identity of a face in an image. The method may begin at step 510, where the computing device 101 may generate a first identity encoding representing a first facial identity of the person based on an image of a person. At step 520, the computing device 101 may generate a second identity encoding representing a second facial identity different from the first facial identity of the person based on the first identity encoding. At step 530, the computing device 101 may generate a source encoding by using an encoder to process a source image of the person having an expression. At step 540, the computing device 101 may generate an intermediate image by using a decoder to process the source encoding and the second identity encoding. The intermediate image may comprise a face having the second facial identity and the expression of the person in the source image. At step 550, the computing device 101 may generate an output image by blending the source image with facial features of the face in the intermediate image. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for altering a face identity of a face in an image including the particular steps of the method of FIG. 5, this disclosure contemplates any suitable method for altering a face identity of a face in an image including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
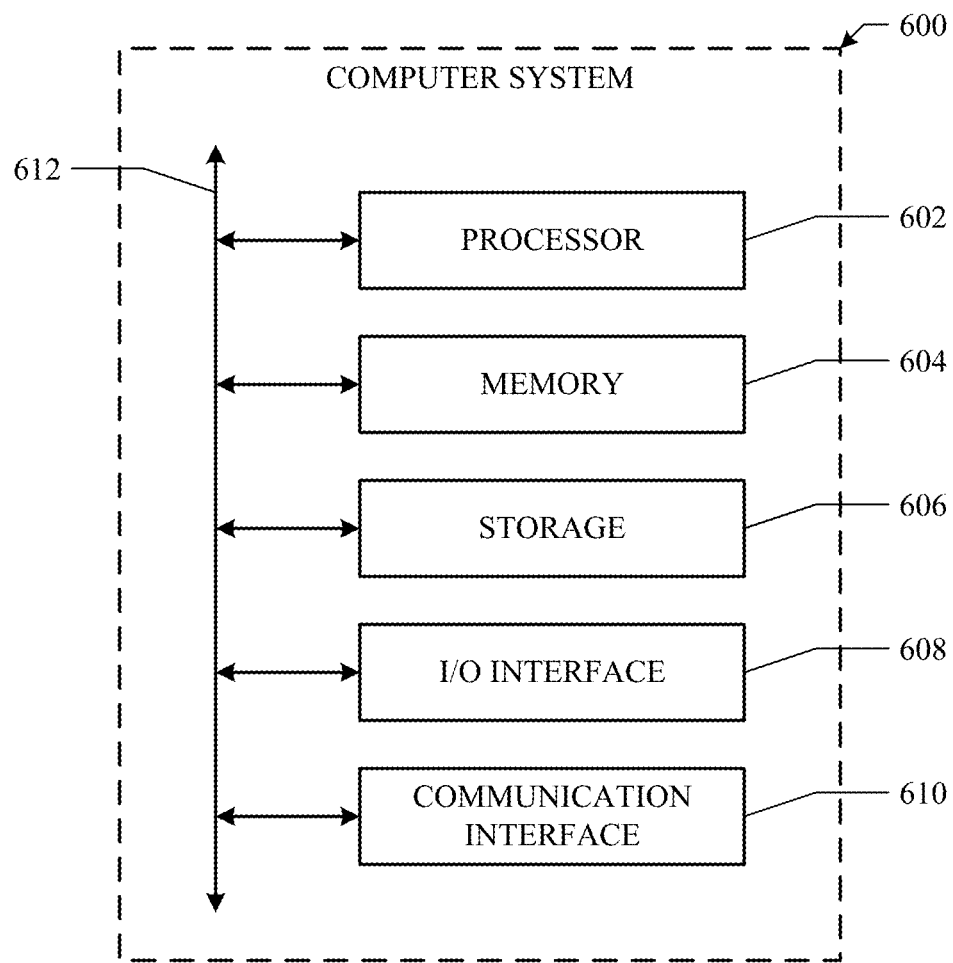
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
generating, based on an image of a person, a first identity encoding representing a first facial identity of the person;
generating a second identity encoding representing a second facial identity different from the first facial identity of the person by processing the first identity encoding with a first facial-identity altering machine-learning model comprising one or more fully connected layers and training data to facilitate generating the second identity encoding, wherein the training data comprises (i) pairs of original face images and corresponding altered face images, and (ii) pairs of images of a different first person and a second person;
generating a source encoding by using an encoder to process a source image of the person comprising an expression;
generating an intermediate image by using a decoder to process the source encoding and the second identity encoding, the intermediate image comprising a face comprising the second facial identity and the expression of the person in the source image; and
generating an output image by blending the source image with facial features of the face in the intermediate image.

2. The method of claim 1, wherein a first machine-learning model is associated with the encoder and the decoder.

3. The method of claim 2, further comprising:
utilizing the pairs of images as training data at an iteration of a training procedure associated with the first machine-learning model, wherein the pairs of images comprise a first image of the first person comprising a second expression and a second image of the second person.

4. The method of claim 3, wherein the iteration of the training procedure comprises:
generating a training source encoding by using the encoder of the first machine-learning model to process a distorted first image of the pair;
generating a training identity encoding by using a pre-trained face recognition machine-learning model to process the second image of the pair;
generating a training intermediate image by using the decoder of the first machine-learning model to process the training source encoding and the training identity encoding;
generating a training output image by blending the first image with facial features of a face in the training intermediate image;
determining losses based on the training intermediate image or the training output image, wherein the losses comprise perceptual losses; and
updating trainable variables of the first machine-learning model based on the computed losses.

5. The method of claim 4, wherein the distorted first image prevents the first machine-learning model from generating the training intermediate image identical to the first image.

6. The method of claim 4, further comprising:
determining the perceptual losses at k different layers, and wherein the perceptual losses at i lowest layers out of the k layers are determined based on comparisons between the first image and the training output image, and wherein the perceptual losses at the remaining k−i layers are determined based on comparisons between the second image and the training output image.

7. The method of claim 6, further comprising:
updating the trainable variables of the first machine-learning model to minimize the perceptual losses.

8. The method of claim 1, further comprising:
generating the first identity encoding by processing the image with a pre-trained face recognition machine-learning model.

9. The method of claim 1, further comprising:
training the first facial-identity altering machine-learning model with the pairs of original face images and the corresponding altered face images as the training data.

10. The method of claim 9, further comprising:
generating an altered face image corresponding to an original face image by processing the original face image with the first facial-identity altering machine-learning model.

11. The method of claim 10, wherein the first facial-identity altering machine-learning model comprises a second encoder and a second decoder.

12. The method of claim 1, wherein the source image corresponds to a frame of a video stream.

13. The method of claim 1, further comprising:
generating a blending mask in an instance in which the source encoding and the second identity encoding are processed by the decoder, and wherein the blending mask represents a blending weight to be applied to the intermediate image at one or more pixels of the output image.

14. The method of claim 13, wherein blending the source image with facial features of the face in the intermediate image comprises:
creating one or more output images by applying an inverse of the blending mask to the source image; and
projecting the blending mask applied to the intermediate image to the one or more output images.

15. A non-transitory computer-readable medium storing instructions that, when executed, cause:
generating, based on an image of a person, a first identity encoding representing a first facial identity of the person;
generating a second identity encoding representing a second facial identity different from the first facial identity of the person by processing the first identity encoding with a first facial-identity altering machine-learning model comprising one or more fully connected layers and comprising training data to facilitate generating the second identity encoding, wherein the training data comprises (i) pairs of original face images and corresponding altered face images, and (ii) pairs of images of a different first person and a second person;
generating a source encoding by using an encoder to process a source image of the person comprising an expression;
generating an intermediate image by using a decoder to process the source encoding and the second identity encoding, the intermediate image comprising a face comprising the second facial identity and the expression of the person in the source image; and
generating an output image by blending the source image with facial features of the face in the intermediate image.

16. The computer-readable medium of claim 15, wherein a first machine-learning model is associated with the encoder and the decoder.

17. The computer-readable medium of claim 16, wherein the instructions, when executed, further cause:
utilizing the pairs of images as training data at an iteration of a training procedure associated with the first machine-learning model, wherein the pairs of images comprise a first image of the first person comprising a second expression and a second image of the second person.

18. The computer-readable medium of claim 17, wherein the iteration of the training procedure comprises:
generating a training source encoding by using the encoder of the first machine-learning model to process a distorted first image of the pair;
generating a training identity encoding by using a pre-trained face recognition machine-learning model to process the second image of the pair;
generating a training intermediate image by using the decoder of the first machine-learning model to process the training source encoding and the training identity encoding;
generating a training output image by blending the first image with facial features of a face in the training intermediate image;
determining losses based on the training intermediate image or the training output image, wherein the losses comprise perceptual losses; and
updating trainable variables of the first machine-learning model based on the computed losses.

19. A system comprising:
one or more processors; and
at least one non-transitory memory comprising instructions executable by the one or more processors, the one or more processors operable when executing the instructions to:
generate, based on an image of a person, a first identity encoding representing a first facial identity of the person;
generate a second identity encoding representing a second facial identity different from the first facial identity of the person by processing the first identity encoding with a first facial-identity altering machine-learning model comprising one or more fully connected layers and comprising training data to facilitate generating the second identity encoding, wherein the training data comprises (i) pairs of original face images and corresponding altered face images, and (ii) pairs of images of a different first person and a second person;
generate a source encoding by using an encoder to process a source image of the person comprising an expression;
generate an intermediate image by using a decoder to process the source encoding and the second identity encoding, the intermediate image comprising a face comprising the second facial identity and the expression of the person in the source image; and
generate an output image by blending the source image with facial features of the face in the intermediate image.

20. The system of claim 19, wherein the encoder and the decoder belong to a first machine-learning model.

* * * * *